United States Patent
Ellinger et al.

(10) Patent No.: US 6,524,020 B2
(45) Date of Patent: Feb. 25, 2003

(54) CAMERA BUILT INTO A MOTOR VEHICLE

(75) Inventors: Juergen Ellinger, Marbach (DE); Paul Terry, San Juan Capistrano, CA (US); Michael Farnham, Laguna Niguel, CA (US); Jason Hill, Long Beach, CA (US); Martin Meade, Costa Mesa, CA (US)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 09/960,724

(22) Filed: Sep. 24, 2001

(65) Prior Publication Data

US 2002/0041760 A1 Apr. 11, 2002

(30) Foreign Application Priority Data

Sep. 22, 2000 (DE) .......................................... 100 47 066

(51) Int. Cl.$^7$ ........................ G03B 17/00; G03B 29/00; G03B 5/225

(52) U.S. Cl. ........................ 396/419; 396/428; 352/132; 352/243; 348/148; 348/373

(58) Field of Search ................................. 396/419, 427, 396/428; 352/132, 242, 243; 348/143, 148, 151, 373

(56) References Cited

U.S. PATENT DOCUMENTS

| 3,176,602 A | * | 4/1965 | Wilt ......................... 248/205.5 |
|---|---|---|---|
| 3,752,376 A | * | 8/1973 | Shelton et al. ............... 224/275 |
| 4,063,258 A | * | 12/1977 | Allen ......................... 352/132 |
| 4,093,364 A | * | 6/1978 | Miller ........................ 352/132 |
| 4,420,238 A | * | 12/1983 | Felix ...................... 248/183.2 |
| 4,645,320 A | * | 2/1987 | Muelling et al. ........... 352/132 |
| 4,815,757 A | * | 3/1989 | Hamilton ................... 182/69.4 |
| 4,913,458 A | * | 4/1990 | Hamilton ..................... 212/304 |
| 5,012,335 A | * | 4/1991 | Cohodar ...................... 348/158 |
| 5,027,200 A | * | 6/1991 | Petrossian et al. .......... 348/118 |
| 5,833,101 A |   | 11/1998 | Watkins |
| 6,142,437 A | * | 11/2000 | Wilkins, Jr. ................ 248/228.6 |
| 6,215,518 B1 | * | 4/2001 | Watkins ..................... 296/37.6 |
| RE37,709 E | * | 5/2002 | Dukek ........................ 348/143 |

FOREIGN PATENT DOCUMENTS

| EP | 0962359 | | 12/1999 |
| GB | 2238993 | | 6/1991 |
| JP | 3-162189 | * | 7/1991 |

* cited by examiner

Primary Examiner—Alan A. Mathews
(74) Attorney, Agent, or Firm—Crowell & Moring LLP

(57) ABSTRACT

A camera is suitable for installation in a passenger car motor vehicle and is arranged on a superstructure via a retaining device. To make sure that the camera will be advantageously integrated into the motor vehicle, it can be swung by the retaining device out of a resting position sunk into a wall of the superstructure into an extended operating position and vice versa.

13 Claims, 5 Drawing Sheets

CAMERA BUILT INTO A MOTOR VEHICLE

BACKGROUND AND SUMMARY OF THE INVENTION

This application claims the priority of German Patent Document 100 47 066.1, filed in Germany, Sep. 22, 2000, the disclosure of which is expressly incorporated by reference herein.

This invention relates to a camera that is built into a motor vehicle, in particular, a passenger car.

It is known that one can install a camera in a motor vehicle, for example, a single-seat race car, and that one can also use it to take pictures of an auto race after which these pictures are relayed to the public-at-large, for example, with the help of screens.

German Patent Document DE 83 24 913 U1 deals with the mounting of optical instruments, among other things, cameras in a motor vehicle. A fixed device is arranged in the passenger compartment of the motor vehicle to mount the particular camera.

The Italian company publication Pininfarina in Rossa, June 2000, shows a sports car that has, behind the seats of a passenger compartment, a rollover bar that emerges from a superstructure and that is placed at an interval in the lateral direction of the motor vehicle between which [rollover bars] extends a wing. A camera is integrated into that wing, and it is used to transmit traffic events behind the sports car to a screen in the passenger compartment; the idea is to eliminate the rearview mirror.

An object of the invention is to install a camera in a motor vehicle in such a way that, first of all, it will assume a functionally correct position for certain specific pictures and, besides, that it will, in a practical manner, be integrated into a superstructure of the motor vehicle.

This problem is solved according to the invention by a camera assembly for a motor vehicle passenger car, which camera is arranged on a vehicle superstructure via a retaining device, wherein the camera can be swung by a retaining device from a resting position (Rs) that is sunk into a wall of the superstructure into an extended operating position (Bs) and vice versa.

Important advantages to be achieved with the help of the invention reside in the following: The camera is integrated into the superstructure in a concealed manner when in a resting inoperative position and must be swung out of the resting position into the operating position only when there is an actual need. After use, it can in a simple manner again be moved into the sunk resting position, in which it is well secured against unauthorized access. In certain preferred embodiments the retention device cannot only be integrated into the wall of the superstructure without any problem, but it also serves as a carrier for the camera. In certain preferred embodiments the access of rotation and the activation device provide a simple and practical movement of the retaining device with the camera. Finally, in certain preferred embodiments the crank gear between the activation device and the rotation axle of the retention device can be well handled with a justifiable effort.

Other objects, advantages and novel features of the present invention will become apparent from the following detailed description of the invention when considered in conjunction with the accompanying drawings.

DETAILED DESCRIPTION OF THE DRAWINGS

Figure 1:
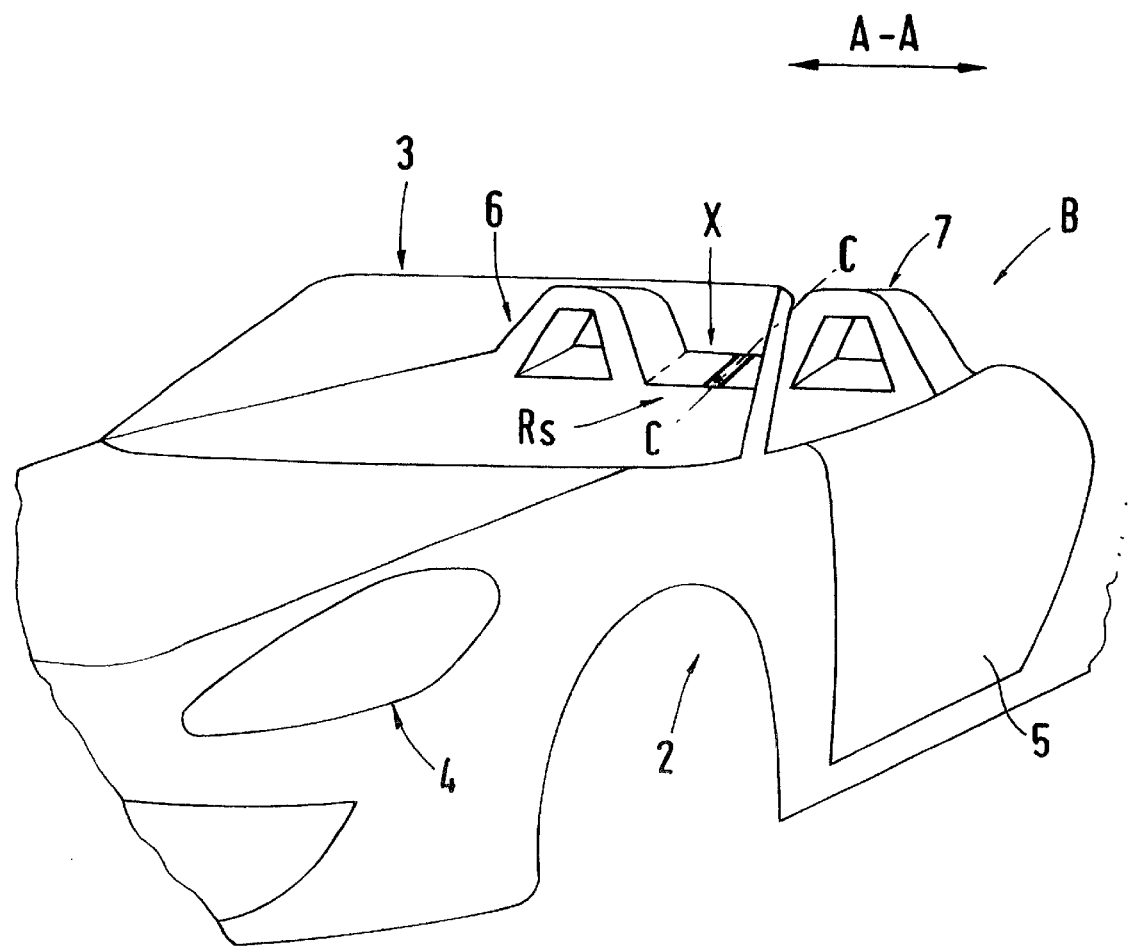
FIG. 1 is a schematic oblique view from the front end of a motor vehicle with a camera, constructed according to preferred embodiments of the invention.

A motor vehicle 1 is embodied by a passenger car of a two seat sports car version and comprises a superstructure 2 with a windshield 3, a nose headlight 4, a door 5 and rollover bars 6 and 7 behind seats, not shown here. A wall 8 extends between the rollover bars 6 and 7 of the superstructure, these rollover bars being arranged at an interval or spacing from each other in a lateral direction of the vehicle A—A; this wall is determined by one of the oblique units 9 that extends in the direction of movement or vehicle travel B from an upper edge 10 to a lower edge 11.

Figure 2:
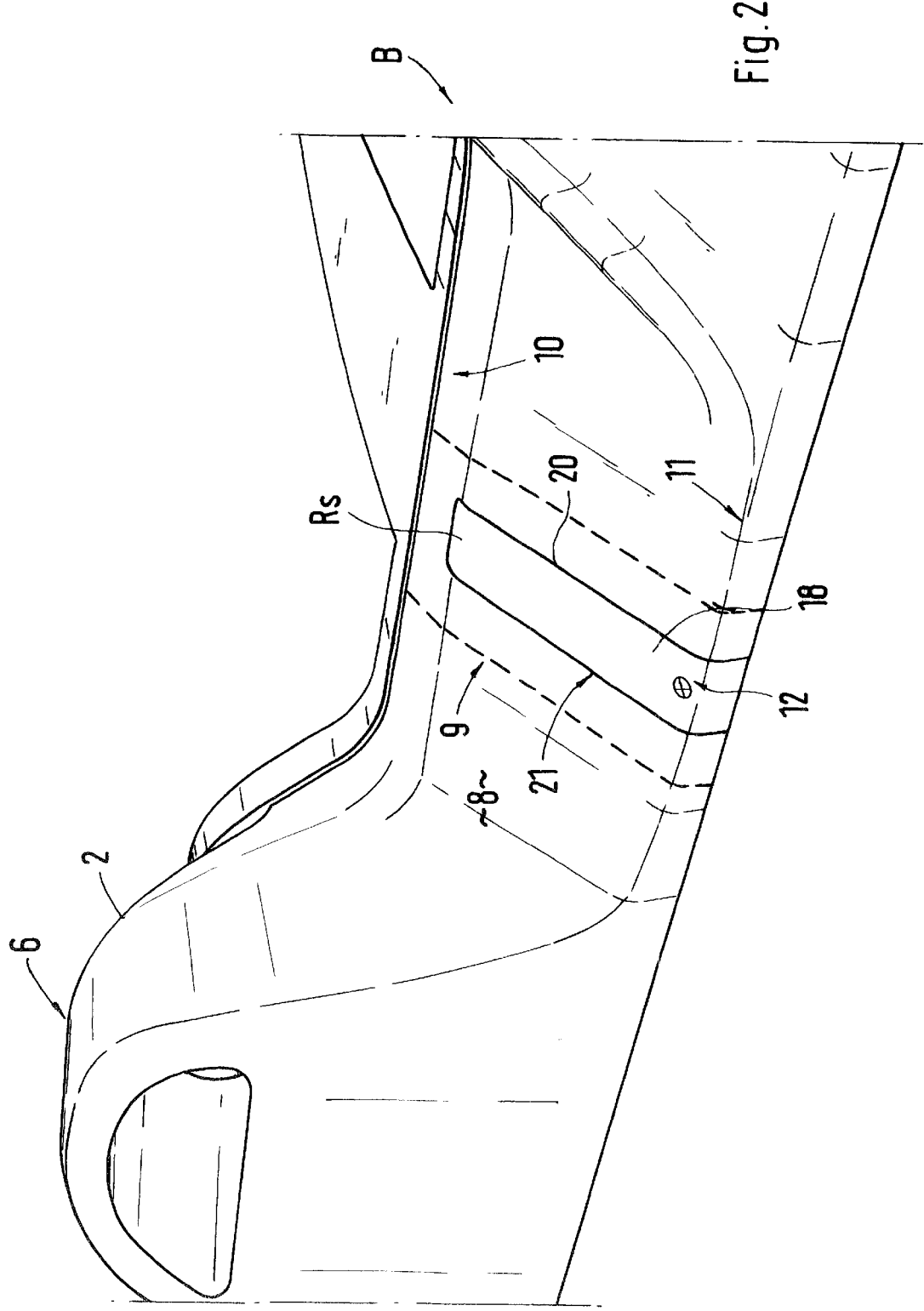
FIG. 2 is a detail X in FIG. 1, shown on a larger scale.
Figure 3:
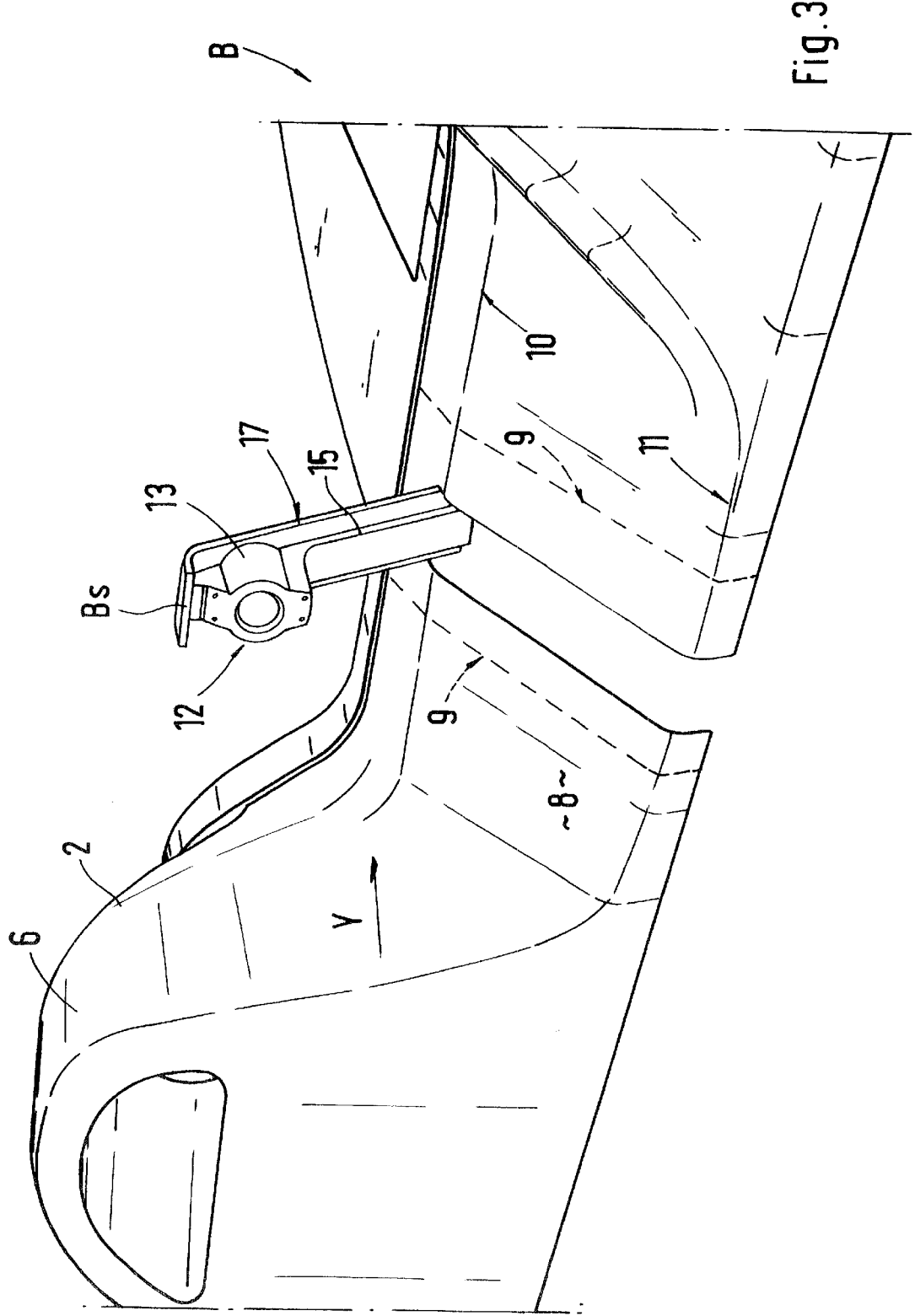
FIG. 3 a view corresponding to FIG. 2, shown in a camera operating position.
Figure 4:
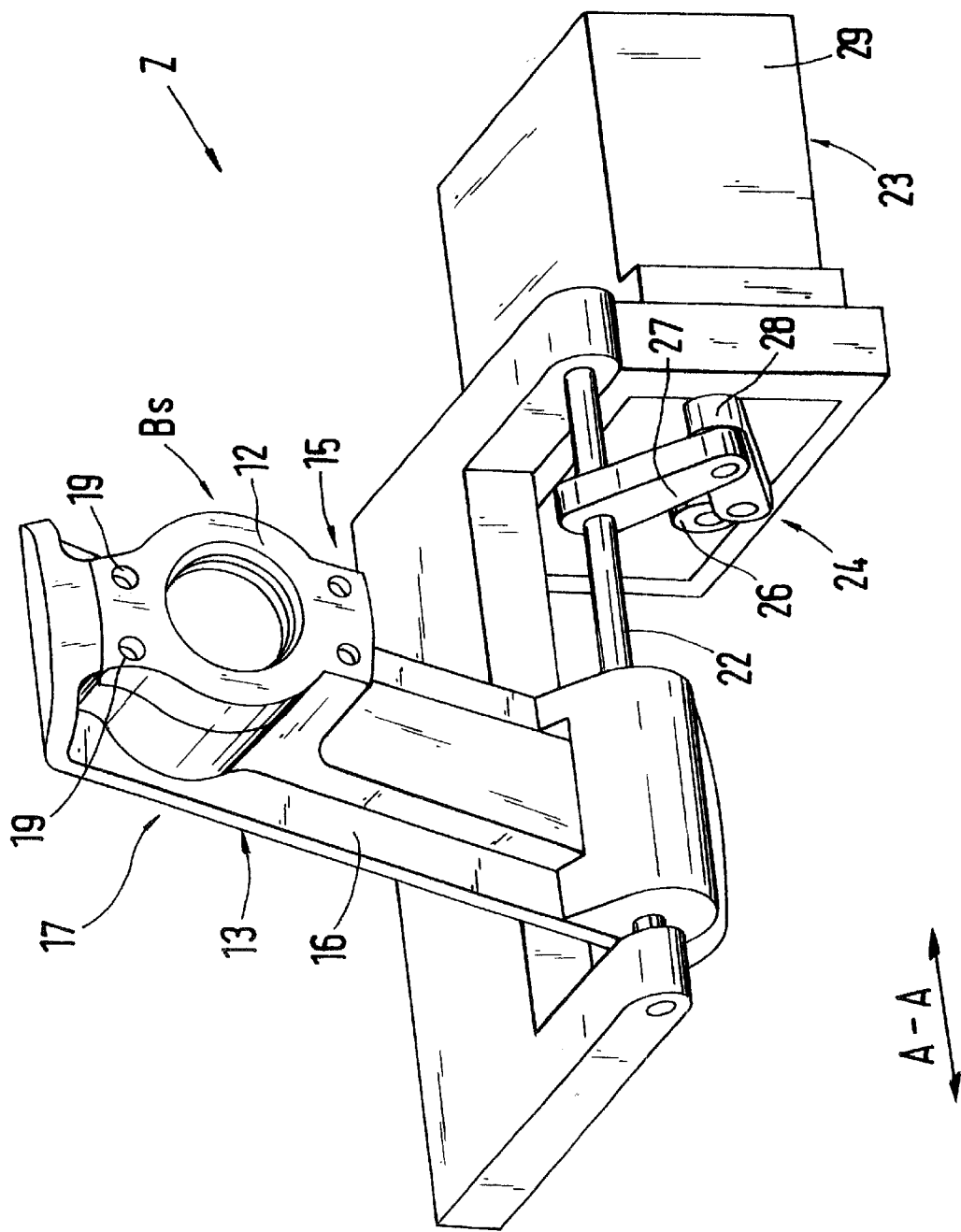
FIG. 4 is a schematic oblique view of a portion of FIG. 3 taken along the direction of arrow Y.
Figure 5:
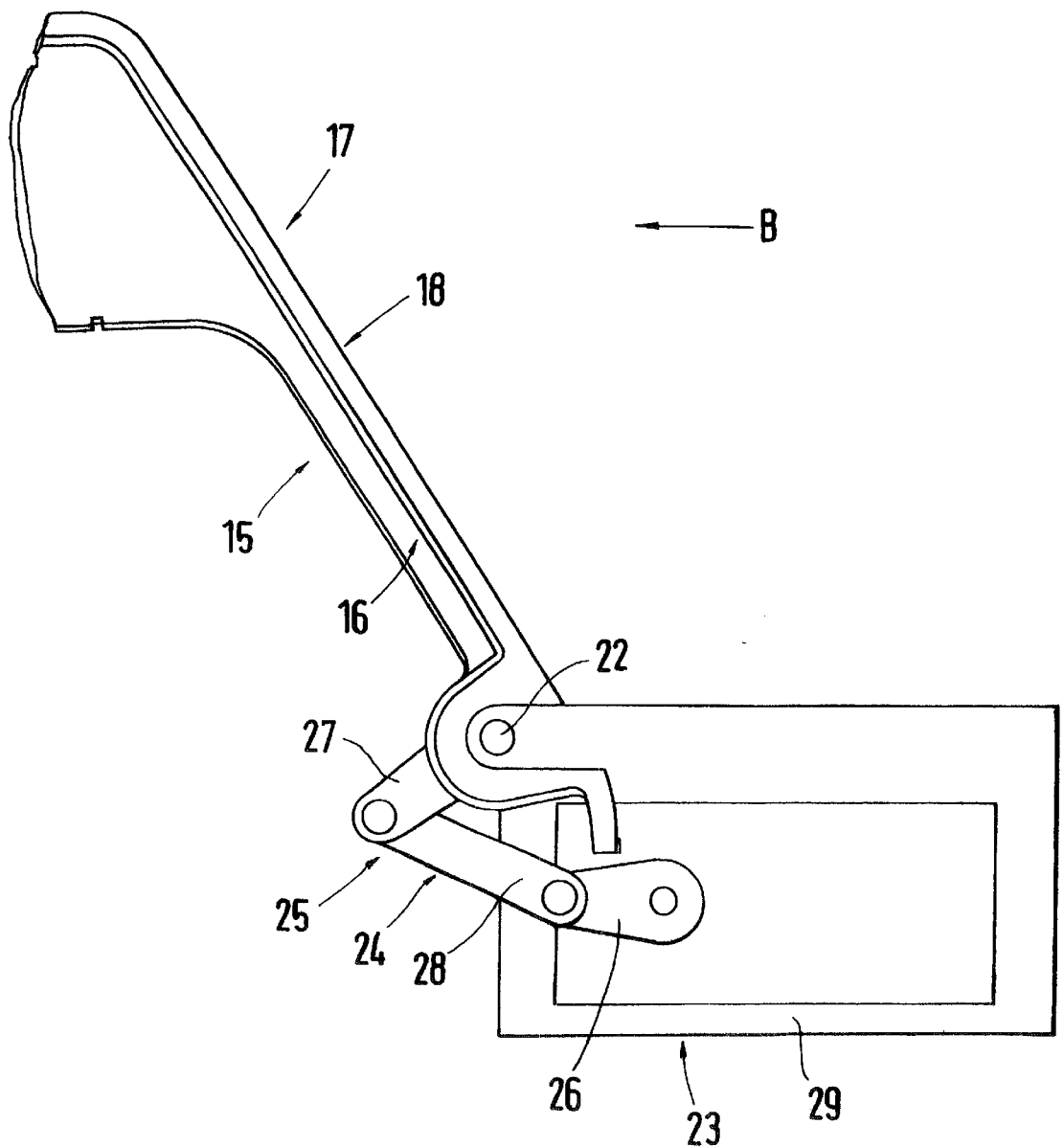
FIG. 5 is a view approximately in the direction of arrow Z in FIG. 4.

In the area of this wall 8, preferably along a longitudinal midplane C—C of the vehicle, there is arranged a camera 12, specifically by way of a retaining device 13. By means of retaining device 13, this camera 12 can be swung out of a sunk resting position Rs (FIGS. 1 and 2) made in wall 8 into an extended operating position Bs (FIGS. 3 and 4) and vice versa. Retaining device 13 is made on a first side 15 as carrier 16 for camera 12, and on a second side 17 as wall segment 18 of wall 8 of superstructure 2. Camera 12 is retained on carrier 16 by screws 19 and wall segment 18 and wall 8 extend in a surface-flush manner with respect to each other. Wall segment 18 has parallel limitations 20 and 21 that extend in the longitudinal direction of the vehicle C—C.

To swing retaining device 13, one uses a rotation axle 22 that is positioned in superstructure 2 and that cooperates with an activation device 23. A gear 24 is provided between the rotation axis of axle 22 and activation device 23; this gear being a crank gear 25 that has a first crank lever 26 on the activation device 23 and a second crank lever 27 on rotation axle 22. Moreover, the first crank lever 26 is connected with the second crank lever 27 via a connecting rod 28. Activation device 23 is formed by an electric motor 29 in the exemplary embodiment. It is, however, also contemplated in other embodiments that in place of the electric motor, one might provide a pneumatic or hydraulic activation device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Camera assembly for a motor vehicle passenger car, comprising a camera arranged on a vehicle superstructure via a retaining device, wherein the camera can be swung by a retaining device from a resting position that is sunk into a wall of the superstructure into an extended operating position and vice-versa;

wherein the retaining device can be swung by a rotation axle that is positioned on the superstructure, which rotation axle cooperates with an activation device;

wherein a gear is provided between the activation device and the rotation axle;

wherein the gear is a crank gear which has a first crank lever on the activation device and a second crank lever on the rotation axle; and wherein a connecting rod is provided between the first crank lever and the second crank lever.

2. Camera according to claim 1, wherein the retaining device is made on a first side as a carrier for the camera and on a second side as a wall segment of the wall of the superstructure.

3. Camera according to claim 2, wherein the wall segment and wall of the superstructure extend in a surface-flush manner toward each other when the camera is in the resting position.

4. Camera according to claim 2, wherein the wall segment has parallel limitations that extend in a longitudinal direction of the vehicle.

5. Camera according to claim 1, wherein the activation device is an electric motor.

6. Camera according to claim 2, wherein the activation device is an electric motor.

7. Camera according to claim 3, wherein the activation device is an electric motor.

8. Camera according to claim 4, wherein the activation device is an electric motor.

9. Camera assembly for a motor vehicle passenger car, comprising a camera arranged on a vehicle superstructure via a retaining device, wherein the camera can be swung by a retaining device from a resting position that is sunk into a wall of the superstructure into an extended operating position and vice-versa; and wherein the wall of the superstructure is a wall between a pair of rollbars located behind a respective pair of passenger seats.

10. A passenger vehicle assembly, comprising:

a vehicle superstructure wall disposed inside a vehicle passenger space, and a camera supported on a retainer device operable to move the camera between an inoperative position in a recess in the superstructure wall and an operative position outside of said recess, wherein said vehicle superstructure wall is a wall adjoining a pair of vehicle rollbars.

11. A passenger vehicle assembly according to claim 10, wherein said retainer device includes a surface which is flush with adjoining walls of the superstructure wall when said camera is in said inoperative position.

12. A passenger vehicle assembly according to claim 10, comprising an electric motor operable to selectively move the retainer device with the camera between said inoperative and operative positions.

13. A passenger vehicle assembly according to claim 10, wherein said retainer device includes a multi-lever linkage between the motor and the retainer.

* * * * *